(12) United States Patent
Mundra et al.

(10) Patent No.: US 11,459,452 B2
(45) Date of Patent: *Oct. 4, 2022

(54) COMPOSITIONS COMPRISING BROMINATED POLYMERIC FLAME RETARDANT

(71) Applicant: Dow Global Technologies LLC, Midland, MI (US)

(72) Inventors: Manish K. Mundra, Collegeville, PA (US); Bharat I. Chaudhary, Princeton, NJ (US); Robert Emmett Scheid, Jr., North Wales, PA (US); Abhijit Ghosh-Dastidar, East Brunswick, NJ (US); Peter C. Dreux, Lumberton, NJ (US)

(73) Assignee: Dow Global Technologies LLC, Midland, MI (US)

(*) Notice: Subject to any disclaimer, the term of this patent is extended or adjusted under 35 U.S.C. 154(b) by 431 days.

This patent is subject to a terminal disclaimer.

(21) Appl. No.: 16/637,786

(22) PCT Filed: Jul. 31, 2018

(86) PCT No.: PCT/US2018/044535
§ 371 (c)(1),
(2) Date: Feb. 10, 2020

(87) PCT Pub. No.: WO2019/032335
PCT Pub. Date: Feb. 14, 2019

(65) Prior Publication Data
US 2020/0216650 A1    Jul. 9, 2020

Related U.S. Application Data

(60) Provisional application No. 62/543,558, filed on Aug. 10, 2017.

(51) Int. Cl.
*C08L 23/08*    (2006.01)
*C08L 53/02*    (2006.01)
*C08L 71/12*    (2006.01)
*C08L 83/10*    (2006.01)
*C09K 21/14*    (2006.01)

(52) U.S. Cl.
CPC ......... *C08L 23/0892* (2013.01); *C08L 53/025* (2013.01); *C08L 71/126* (2013.01); *C08L 83/10* (2013.01); *C09K 21/14* (2013.01); *C08L 2201/02* (2013.01); *C08L 2203/202* (2013.01); *C08L 2312/08* (2013.01)

(58) Field of Classification Search
CPC .. C08L 23/0892; C08L 83/10; C08L 2312/08; C08L 71/126; C08L 2201/02; C08L 2203/202; C08L 53/025; C09K 21/14
USPC ...................................................... 525/288
See application file for complete search history.

(56) References Cited

U.S. PATENT DOCUMENTS

| | | |
|---|---|---|
| 4,144,202 A | 3/1979 | Ashcraft et al. |
| 4,255,303 A | 3/1981 | Keogh |
| 4,574,133 A | 3/1986 | Umpleby |
| 5,034,442 A | 7/1991 | Hirose et al. |
| 5,066,752 A | 11/1991 | Favstritsky et al. |
| 5,246,783 A | 9/1993 | Spenadel et al. |
| 5,266,627 A | 11/1993 | Meverden et al. |
| 5,272,236 A | 12/1993 | Lai et al. |
| 5,278,272 A | 1/1994 | Lai et al. |
| 5,986,028 A | 11/1999 | Lai et al. |
| 6,048,935 A | 4/2000 | Penfold et al. |
| 6,331,597 B1 | 12/2001 | Drumright et al. |
| 6,496,629 B2 | 12/2002 | Ma et al. |
| 6,714,707 B2 | 3/2004 | Rossi et al. |
| 6,936,655 B2 | 8/2005 | Borke et al. |
| 7,355,089 B2 | 4/2008 | Chang et al. |
| 7,504,347 B2 | 3/2009 | Poon et al. |
| 7,514,489 B2 | 4/2009 | Granada, Jr. et al. |
| 7,514,517 B2 | 4/2009 | Hoenig et al. |
| 7,524,911 B2 | 4/2009 | Karjala et al. |
| 7,579,408 B2 | 8/2009 | Walton et al. |
| 7,582,716 B2 | 9/2009 | Liang et al. |
| 7,951,859 B2 | 5/2011 | Lin et al. |
| 10,093,781 B2 | 10/2018 | Matsue et al. |
| 2008/0251273 A1 | 10/2008 | Brown et al. |
| 2015/0197875 A1 | 7/2015 | Kim et al. |
| 2018/0112096 A1 | 4/2018 | Shimada et al. |

(Continued)

FOREIGN PATENT DOCUMENTS

| | | |
|---|---|---|
| CN | 102272173 B | 5/2015 |
| JP | 1989236265 | 9/1989 |
| JP | 2016121203 | 7/2016 |

(Continued)

OTHER PUBLICATIONS

McNeill, I. C., et al., "Structure and Stability of Halogenated Polymers: Part 4—Chain Brominated Polystyrene," Polymer Degradation and Stability, 1989, p. 1-9, vol. 25, No. 1.
Office Action Reporting Letter from corresponding Chinese Patent Application No. 201880060866.8 dated Jul. 8, 2022.
Office Action from corresponding Japanese Application No. 2020-505149 dated Jun. 3, 2022.

* cited by examiner

*Primary Examiner* — Hui H Chin (57) ABSTRACT

Silane-functionalized compositions comprising a polymeric brominated flame retardant with a weight average molecular weight (Mw) of equal to or greater than (≥) 1,000 g/mol exhibit improved burn and crush strength properties as compared to silane-functionalized compositions alike in all aspects except that the Mw of the brominated flame retardant is less than (<) 1,000 g/mol.

10 Claims, 3 Drawing Sheets

(56) References Cited

U.S. PATENT DOCUMENTS

2018/0127555 A1\* 5/2018 Chaudhary ................ C08J 3/20

FOREIGN PATENT DOCUMENTS

| WO | 2007058736 | 5/2007 |
| WO | 2013116283 | 8/2013 |
| WO | 2014014648 A2 | 1/2014 |
| WO | 2015195267 | 12/2015 |
| WO | 2016152432 | 9/2016 |
| WO | 2016176034 | 11/2016 |

Figure 1a: Burn Performance of the Compositions of Table 2 (from Table 3)

Figure 1b: Burn Performance of the Compositions of Table 2 (from Table 3)

Figure 2a: Increase in SAYTEX™ 8010 loading shows reduction in wet IR performance Figure 2b: Increase in Emerald Innovation 1000 loading shows improvement in wet IR performance Figure 2c: Plot showing better performance with Emerald Innovation 1000 vs. SAYTEX™ 8010 filler in wet IR performance at same loading Figure 3: Burn Performance of the Compositions of Table 10 or Table 12.

COMPOSITIONS COMPRISING BROMINATED POLYMERIC FLAME RETARDANT

FIELD OF THE INVENTION

This invention relates to polyolefin compositions comprising a brominated polymeric flame retardant. This invention also relates to wire and cable constructions made from such compositions, in particular those that are moisture cross-linkable.

BACKGROUND OF THE INVENTION

Halogenated flame retardants are well known and widely available. These products are used in various polymeric compositions and provide varying levels of flame retardance for various applications such as wires and cables. These products can provide good flame retardance if incorporated at high loadings but these high loadings make it difficult to achieve a balance of desired properties, e.g., mechanicals (such as crush resistance), electricals (such as wet insulation resistance), and extrusion (such as die pressure observed). Of continued interest are halogenated flame retardants that can provide good flame retardance without the sacrifice, or at least a diminished sacrifice, of other desirable properties.

Alkoxysilane functionalized ethylenic polymers (in combination with appropriate silanol condensation catalysts) are widely employed to make the insulation/jacket layers of low voltage cable constructions (by extrusion processes). Alkoxysilane functionalized ethylenic polymers can be made either by copolymerization of ethylene with suitable alkoxysilanes in a reactor (to make "reactor ethylene silane copolymers", such as SI-LINK™ AC DFDB-5451 NT or SI-LINK™ DFDA-5451 NT), or by post-reactor grafting of alkoxysilanes to ethylenic polymers. Those alkoxysilane functionalized ethylenic polymers that are made by the latter approach are referred to as "silane grafted ethylenic polymers", and can be classified as one of the following two types:
1. SIOPLAS™ process (made in a separate step prior to use in the cable extrusion process); or
2. MONOSIL™ process (made in situ during the cable manufacturing process—by one step melt blending, reaction and extrusion of ethylenic polymer compositions containing peroxide, silane and catalyst).

After extrusion, the cables are conditioned at humid conditions in order to effect crosslinking of the polymer layers (to yield adequately low hot creep values, measured at 150° C. or 200° C.). The entire cable construction needs to demonstrate sufficiently high abuse-resistance properties (in particular, crush resistance and retained dielectric strength after glancing impact). These performance requirements can be particularly challenging to meet when the compositions contain fillers, such as high loadings of flame-retardants.

SUMMARY OF THE INVENTION

In one embodiment the invention is a moisture-crosslinkable composition comprising, in weight percent (wt %) based on the weight of the composition:
(A) 10-79 wt % alkoxysilane functionalized ethylenic polymer;
(B) 16-70 wt % polymeric brominated flame retardant of weight average molecular weight (Mw) equal to or greater than ($\geq$) 1000 grams per mole (g/mol); preferably $\geq$10,000 g/mol; more preferably $\geq$25,000 g/mol; even more preferably $\geq$50,000 g/mol; still more preferably $\geq$75,000 g/mol and most preferably $\geq$100,000 g/mol; and
(C) 0.01-20 wt % silanol condensation catalyst.

In one embodiment the alkoxysilane functionalized ethylenic polymer is an ethylene-silane reactor copolymer or a silane-grafted (Si-g-) ethylenic polymer. In one embodiment the brominated flame retardant is a brominated aromatic flame retardant including (but not limited to) brominated polyphenyl ether and brominated styrene/butadiene block copolymer (Br-SBC). An example of brominated polyphenyl ether is Emerald Innovation™ 1000. An example of Br-SBC is Emerald Innovation™ 3000 of weight average molecular weight greater than (>) 100,000 g/mol (CAS No. 1195978-93-8). In one embodiment the silanol condensation catalyst is a tin carboxylate.

In one embodiment the invention is a moisture-crosslinkable composition comprising, in weight percent (wt %) based on the weight of the composition:
(A) 4.0-83.67 wt % ethylenic polymer;
(B) 0.3-5 wt % of a graftable silane-containing compound, e.g., an alkoxysilane;
(C) 0.02-1.0 wt % peroxide initiator;
(D) 16-70 wt % polymeric brominated flame retardant of weight average molecular weight (Mw) equal to or greater than ($\geq$) 1000 grams per mole (g/mol); preferably $\geq$10,000 g/mol; more preferably $\geq$25,000 g/mol; even more preferably $\geq$50,000 g/mol; still more preferably $\geq$75,000 g/mol and most preferably $\geq$100,000 g/mol; and
(E) 0.01-20 wt % silanol condensation catalyst.

In one embodiment the composition is a moisture-crosslinked composition comprising, in weight percent (wt %) based on the weight of the composition:
(A) 10-79 wt % alkoxysilane functionalized ethylenic polymer;
(B) 16-70 wt % polymeric brominated flame retardant of a weight average molecular weight (Mw) equal to or greater than ($\geq$) 1000 grams per mole (g/mol); preferably $\geq$10,000 g/mol; more preferably $\geq$25,000 g/mol; even more preferably $\geq$50,000 g/mol; still more preferably $\geq$75,000 g/mol; and most preferably $\geq$100,000 g/mol; and
(C) 0.01-20 wt % silanol condensation catalyst.

In one embodiment the invention is a composition comprising a alkoxysilane functionalized ethylenic polymer and a polymeric brominated flame retardant with a weight average molecular weight (Mw) of $\geq$1000, preferably $\geq$10,000, more preferably $\geq$25,000, even more preferably $\geq$50,000, still more preferably $\geq$75,000, and most preferably $\geq$100,000 g/mol. These compositions, after moisture induced crosslinking, exhibit a surprisingly improved balance of properties as compared with compositions alike in all aspects except for the weight average molecular weight of the brominated flame retardant, i.e., alike in all aspects except that the Mw of the comparative brominated flame retardant is less than (<) 1000 g/mol. Wire and cable constructions made with the compositions of this invention demonstrate improvements in one or more of the following properties: crush resistance, burn performance, wet insulation resistance and retained AC breakdown strength after glancing impact.

DETAILED DESCRIPTION OF THE PREFERRED EMBODIMENT

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2; or 3 to 5; or 6; or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

"Composition" and like terms mean a mixture of materials which comprise the composition, as well as reaction products and decomposition products formed from the materials of the composition.

"Polymer" and like terms mean a macromolecular compound prepared by reacting (i.e., polymerizing) monomers of the same or different type. "Polymer" includes homopolymers and interpolymers. Trace amounts of impurities, for example, catalyst residues, may be incorporated into and/or within the polymer. The term also embraces all forms of copolymer, e.g., random, block, etc. Although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers are referred to has being based on "units" that are the polymerized form of a corresponding monomer.

"Interpolymer" means a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Polyolefin", "PO" and like terms mean a polymer derived from simple olefins. Many polyolefins are thermoplastic and for purposes of this invention, can include a rubber phase. Representative polyolefins include polyethylene, polypropylene, polybutene, polyisoprene and their various interpolymers.

"Ethylenic polymer", "ethylene-based polymer," "ethylene polymer," "polyethylene" and like terms mean a polymer that contains equal to or greater than 50 weight percent (wt %), or a majority amount, of polymerized ethylene based on the weight of the polymer, and, optionally, may comprise one or more comonomers. The generic term "ethylene-based polymer" thus includes ethylene homopolymer and ethylene interpolymer.

A "conductor" is an element of elongated shape (wire, cable, optical fiber) for transferring energy at any voltage (DC, AC, or transient). The conductor is typically at least one metal wire or at least one metal cable (such as aluminum or copper), but may be optical fiber. The conductor may be a single cable or a plurality of cables bound together (i.e., a cable core, or a core).

A "sheath" is a generic term and when used in relation to cables, it includes insulation coverings or layers, protective jackets and the like.

A "wire" is a single strand of conductive metal, e.g., copper or aluminum, or a single strand of optical fiber.

A "cable" is at least one conductor, e.g., wire, optical fiber, etc., within a protective jacket or sheath. Typically, a cable is two or more wires or two or more optical fibers bound together in a common protective jacket or sheath. Combination cables may contain both electrical wires and optical fibers. The individual wires or fibers inside the jacket or sheath may be bare, covered or insulated. Typical cable designs are illustrated in U.S. Pat. Nos. 5,246,783; 6,496,629; and 6,714,707.

"Crosslinkable," "curable" and like terms indicate that the polymer, before or after shaped into an article, is not cured or crosslinked and has not been subjected or exposed to treatment that has induced substantial crosslinking although the polymer comprises additive(s) or functionality which will cause, promote or enable substantial crosslinking upon subjection or exposure to such treatment (e.g., exposure to water).

"Moisture-crosslinkable polymeric composition" and like terms mean a composition that comprises a polymer that can be crosslinked upon exposure to humidity or water under appropriate temperature. Preferably, one of the polymers in the composition has hydrolysable silane groups.

"Hydrolysable silane group" and like terms mean a silane group that will react with water. These include alkoxysilane groups on monomers or polymers that can hydrolyze to yield silanol groups, which in turn can condense to crosslink the monomers or polymers.

"Room temperature" and like terms mean 23° C.

Ethylenic Polymer Having Hydrolysable Silane Groups

Ethylenic Polymer

The ethylenic polymers used in the practice of this invention can be branched, linear, or substantially linear, and can be made by polymerization or copolymerization in a reactor (low pressure or high pressure) or by post-reactor modification (such as reactive extrusion to make a graft copolymer). As used herein, the term "high-pressure reactor" or "high-pressure process" is any reactor or process operated at a pressure of at least 5000 pounds per square inch (psi) (34.47 megaPascal or mPa). As known to those of ordinary skill in the art, "branched" ethylenic polymers are often (but not only) prepared in a high-pressure reactor or process and tend to have highly branched polymer structures, with branches found both on the polymer backbones and on the branches themselves. In contrast, "substantially linear" denotes a polymer having a backbone that is substituted with 0.01 to 3 long-chain branches per 1,000 carbon atoms. In some embodiments, the ethylenic polymer can have a backbone that is substituted with 0.01 to 1 long-chain branches per 1,000 carbon atoms, or from 0.05 to 1 long-chain branches per 1,000 carbon atoms.

The ethylenic polymers used in the practice of this invention include both homopolymers and interpolymers, random and blocky copolymers, and functionalized (e.g., ethylene vinyl acetate, ethylene ethyl acrylate, etc.) and non-functionalized polymers. The ethylenic interpolymers include elastomers, flexomers and plastomers. The ethylene polymer comprises at least 50, preferably at least 60 and more preferably at least 80, wt % of units derived from ethylene. The other units of the ethylenic interpolymer are typically derived from one or more polymerizable monomers including (but not limited to) α-olefins and unsaturated esters.

The α-olefin is preferably a C3-20 linear, branched or cyclic α-olefin. Examples of C3-20 α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Similarly, styrene and its related olefins (for example, α-methylstyrene, etc.) are α-olefins for purposes of this invention. Illustrative ethylenic interpolymers include copolymers of ethylene/propylene, ethylene/butene, ethylene/1-hexene, ethylene/1-octene, ethylene/styrene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

In various embodiments, the unsaturated esters can be alkyl acrylates, alkyl methacrylates, or vinyl carboxylates. The alkyl groups can have from 1 to 8 carbon atoms, or from 1 to 4 carbon atoms. The carboxylate groups can have from 2 to 8 carbon atoms, or from 2 to 5 carbon atoms. Examples of acrylates and methacrylates include, but are not limited to, ethyl acrylate, methyl acrylate, methyl methacrylate, t-butyl acrylate, n-butyl acrylate, n-butyl methacrylate, and 2 ethylhexyl acrylate. Examples of vinyl carboxylates include, but are not limited to, vinyl acetate, vinyl propionate, and vinyl butanoate.

Examples of ethylenic polymers useful in the practice of this invention include high density polyethylene (HDPE); medium density polyethylene (MDPE); linear low density polyethylene (LLDPE); low density polyethylene (LDPE); very low density polyethylene (VLDPE); homogeneously branched, linear ethylene/α-olefin copolymers (e.g. TAFMER™ by Mitsui Petrochemicals Company Limited and EXACT™ by DEX-Plastomers); homogeneously branched, substantially linear ethylene/α-olefin polymers (e.g., AFFINITY™ polyolefin plastomers and ENGAGE™ polyolefin elastomers available from The Dow Chemical Company); and ethylene block copolymers (INFUSE™ also available from The Dow Chemical Company). The substantially linear ethylene copolymers are more fully described in U.S. Pat. Nos. 5,272,236, 5,278,272 and 5,986,028, and the ethylene block copolymers are more fully described in U.S. Pat. Nos. 7,579,408, 7,355,089 7,524,911, 7,514,517, 7,582, 716 and 7,504,347.

Ethylenic interpolymers of particular interest for use in the practice of this invention are LDPE, linear low density polyethylene (LLDPE) and HDPE. These ethylenic copolymers are commercially available from a number of different sources including The Dow Chemical Company under such trademarks as DOWLEX™, ATTANE™ and FLEXOMER™. One preferred polymer is linear low density polyethylene (LLDPE).

They ethylenic polymers have a melt index ($I_2$) in the range of 0.1 to 50 decigrams per minute (dg/min), or 0.3 to 30 dg/min, or 0.5 to 20 dg/min. $I_2$ is determined under ASTM D-1238, Condition E and measured at 190° C. and 2.16 kg.

In one embodiment, the ethylenic polymer is of any crystallinity at room temperature. In one embodiment, the crystallinity at room temperature of the ethylenic polymer ranges from 0% to 80%, or 10% to 80%, or 30% to 70%, or 35% to 60%, or 40% to 50%.

Crystallinity at room temperature is calculated or measured as described in the Examples.

The ethylenic polymers can be blended or diluted with one or more other polymers to the extent that the polymers of this invention constitute at least about 70, preferably at least about 75 and more preferably at least about 80, weight percent of the polymer blend.

Silane Functionality

Any silane (or silane-containing compound) that will effectively copolymerize with ethylene, or graft to an ethylenic polymer, and thus enable crosslinking of the ethylenic polymer, can be used in the practice of this invention, and those described by the following formula are exemplary in which R' is a hydrogen atom or methyl group; x and y are 0 or 1 with the proviso that when x is 1, y is 1; n is an integer from 1 to 12 inclusive, preferably 1 to 4, and each R" independently is a hydrolyzable organic group such as an alkoxy group having from 1 to 12 carbon atoms (e.g. methoxy, ethoxy, butoxy), aryloxy group (e.g. phenoxy), araloxy group (e.g. benzyloxy), aliphatic acyloxy group having from 1 to 12 carbon atoms (e.g. formyloxy, acetyloxy, propanoyloxy), amino or substituted amino groups (alkylamino, arylamino), or a lower alkyl group having 1 to 6 carbon atoms inclusive, with the proviso that not more than one of the three R" groups is an alkyl. Such silanes may be copolymerized with ethylene in a reactor, such as a high pressure process, to make a copolymer of ethylene and a monomer with hydrolyzable silane groups. Such silanes may also be grafted to a suitable ethylenic polymer, such as those described above, by the use of a suitable quantity of organic peroxide, either before or during a shaping or molding operation, to make a silane-grafted ethylenic polymer (Si-g-EP) that has hydrolyzable silane groups.

Suitable silanes include unsaturated silanes that comprise an ethylenically unsaturated hydrocarbyl group, such as a vinyl, allyl, isopropenyl, butenyl, cyclohexenyl or gamma-(meth)acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, propriony-loxy, and alkyl or arylamino groups. Preferred silanes are the unsaturated alkoxy silanes which can be grafted onto the polymer or copolymerized in-reactor with other monomers (such as ethylene and acrylates). These silanes and their method of preparation are more fully described in U.S. Pat. No. 5,266,627. Vinyl trimethoxy silane (VTMS), vinyl tri-ethoxy silane, vinyl triacetoxy silane, gamma-(meth)acry-loxy propyl trimethoxy silane and mixtures of these silanes are the preferred silane crosslinkers for use in this invention.

The amount of silane ("crosslinker") used to functionalize the ethylenic polymer can vary widely depending upon the nature of the polymer, the silane, the processing or reactor conditions, the grafting or copolymerization efficiency, the ultimate application, and similar factors, but typically at least 0.5, preferably at least 0.7, weight percent is used. Considerations of convenience and economy are two of the principal limitations on the maximum amount of silane used, and typically the maximum amount of silane does not exceed 5, preferably it does not exceed 3, weight percent.

The silane is grafted to the ethylenic polymer by any conventional method, typically in the presence of a free radical initiator, e.g. peroxides and azo compounds, or by ionizing radiation, etc. Organic initiators are preferred, such as any one of the peroxide initiators, for example, dicumyl peroxide, di-tert-butyl peroxide, t-butyl perbenzoate, ben-zoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. A suitable azo compound is 2,2-azobisisobutyronitrile. The amount of initiator can vary, but it is typically present in an amount of at least 0.02, preferably at least 0.04, more preferably at least 0.06 wt %. Typically, the initiator does not exceed 1.0, preferably it does not exceed 0.30, most preferably it does not exceed 0.20 wt %. The ratio of silane to initiator also can vary widely, but the typical crosslinker: initiator ratio is between 0.3:1 to 250:1, preferably 5:1 to 50:1, more preferably 10:1 to 30:1, most preferably between 13:1 and 24:1.

While any conventional method can be used to graft the silane to the ethylenic polymer, one preferred method is blending the two with the initiator in the first stage of a reactor extruder, such as a twin screw extruder or BUSS™ kneader. Such a process to make silane-grafted ethylenic polymer (Si-g-EP) is referred to as the SIOPLAS process, in which a silane monomer is grafted onto the backbone of a base ethylenic polymer by a process such as extrusion, prior to the polymer's incorporation into the present composition, as described, for example, in U.S. Pat. Nos. 4,574,133; 6,048,935; and 6,331,597. The grafting conditions can vary, but the melt temperatures are typically between 160 and 260° C., preferably between 190 and 230° C., depending upon the residence time and the half-life of the initiator.

In an embodiment, the silane-functionalized ethylenic polymer is an in situ Si-g-EP. The in situ Si-g-EP is formed by a process such as the MONOSIL process, in which a silane monomer is grafted onto the backbone of a base ethylenic polymer during the extrusion of the present composition to form a coated conductor, as described, for example, in U.S. Pat. No. 4,574,133.

Copolymerization of unsaturated alkoxy silane cross-linkers with ethylene and other monomers may be done in a high-pressure reactor that is used in the manufacture of ethylene homopolymers and copolymers with vinyl acetate and acrylates.

In one embodiment of the invention in which the composition comprises a silane-functionalized ethylenic polymer, the amount of the silane-functionalized polymer in the composition is typically from 10 to 79 wt %, or to 78 wt %, or to 77 wt %, or to 76 wt %, or to 75 wt %, or to 70 wt %, or to 65 wt %, or to 60 wt %, or to 55 wt %, or to 50 wt %, or to 45 wt %, or to 40 wt %, or to 35 wt %, or to 30 wt %, or to 25 wt %, or to 20 wt %.

In one embodiment of the invention in which the composition comprises a silane-functionalized ethylenic polymer, the amount of the silane-functionalized polymer in the composition is typically from 79 to 13 wt %, or to 20 wt %, or to 25 wt %, or to 27 wt %, or to 29 wt %, or to 31 wt %, or to 33 wt %, or to 35 wt %, or to 37 wt %, or to 40 wt %, or to 45 wt %, or to 50 wt %, or to 55 wt %, or to 60 wt %, or to 65 wt %, or to 70 wt %, or to 75 wt %.

Polymeric Brominated Flame Retardant

The polymeric brominated flame retardants are known compounds and many are commercially available. In one embodiment of the invention, the brominated flame retardant has Mw ≥1000 g/mol, preferably ≥10,000 g/mol, more preferably ≥25,000 g/mol, even more preferably ≥50,000 g/mol, still more preferably ≥75,000 g/mol, and most preferably ≥100,000 g/mol, In an embodiment, the brominated flame retardant has Mw ≤1,000,000 g/mol, preferably ≤500,000 g/mol, and most preferably ≤200,000 g/mol.

In one embodiment the polymeric brominated flame retardant is a thermally stable brominated copolymer, the copolymer having polymerized therein a butadiene moiety and a vinyl aromatic monomer moiety, the copolymer having, prior to bromination, a vinyl aromatic monomer content of from 5 to 90 percent by weight, based upon copolymer weight, a 1,2-butadiene isomer content of greater than 0 percent by weight, based upon butadiene moiety weight, and a weight average molecular weight of at least 1000. The brominated copolymer has an unbrominated, nonaromatic double bond content of less than 50 percent, based upon nonaromatic double bond content of the copolymer prior to bromination as determined by $^1$H NMR spectroscopy (that is, greater than 50% of the butadiene repeat units are brominated) and a five percent weight loss temperature (5% WLT), as determined by thermogravimetric analysis (TGA) of at least 200° C. The unbrominated, non-aromatic double bond content is preferably less than or equal to 15 percent, even more preferably less than 10 percent, in each instance based upon nonaromatic double bond content of the copolymer prior to bromination, that is, the proportion of butadiene repeat units that are brominated is preferably at least 85% and more preferably at least 90%.

In one embodiment the brominated copolymer is a brominated butadiene/vinyl aromatic monomer copolymer, particularly a brominated styrene/butadiene block copolymer (Br-SBC). The SBC, prior to bromination, may be any of di-block copolymer (e.g., styrene-butadiene), triblock copolymer (e.g., styrene/butadiene/styrene or SBS), tetrablock copolymer (e.g., styrene/butadiene/styrene/butadiene or SBSB) or multiblock copolymer (e.g., styrene/butadiene/styrene/butadiene/styrene or SBSBS). SBCs may be prepared by any process known in the art including random polymerization with preparation via sequential anionic polymerization or by coupling reactions being preferred. Of the foregoing, brominated triblock copolymers such as SBS block copolymers are especially preferred.

While Br-SBCs are preferred, the brominated butadiene/vinyl aromatic monomer copolymer may also be a random copolymer prepared by conventional free radical polymerization, or by modifications of anionic polymerization (such as use of polar modifiers) or a graft copolymer prepared by grafting, for example, a polymerized styrene monomer chain onto a polybutadiene homopolymer (PBD) backbone.

Brominated butadiene/vinyl aromatic monomer copolymers, including Br-SBC, and processes for their preparation and use are more fully described in WO 2007/058736.

Non-limiting copolymers used to make the brominated copolymers (i.e. prior to bromination), have the following key properties: a weight average molecular weight (Mw) within a range from 1,000 to 200,000, preferably from 2,000 to 180,000, more preferably from 5,000 to 160,000 and even more preferably, at least from a commercial availability point of view, from 100,000 to 160,000; and a polymerized vinyl aromatic monomer content of at least 5 wt %, preferably within a range of from 5 wt % to 90 wt %, based upon block copolymer weight; and a measurable 1,2-isomer content, i.e., greater than 0 percent.

Representative brominated flame retardants include, but are not limited to, brominated polystyrene; poly(4-bromostyrene); poly(bromostyrene); brominated natural and synthetic rubber; polyvinyl bromide; poly(vinylidene bromide); poly(2-bromoethyl methacrylate); poly(2,3-dibromopropyl methacrylate); poly(methyl-α-bromoacrylate); butadiene styrene brominated copolymer; those described in WO 2014/014648 A2 and those described in U.S. Pat. No. 5,066,752; and those described in *Polymer Degradation and Stability*, 25(1):1-9 (1989).

In an embodiment, the polymeric brominated flame retardant has a bromine content greater than 50 weight percent, preferably greater than 55 weight percent and, more preferably greater than 60 weight percent.

In one embodiment of the invention in which the composition comprises a polymeric brominated flame retardant of a weight average molecular weight equal to or greater than 1000 grams per mole, the amount of the polymeric brominated flame retardant in the composition is typically from 16 to 70 wt %, or to 65 wt %, or to 60 wt %, or to 55 wt %, or to 52 wt %, or to 50 wt %, or to 48 wt %, or to 46 wt %, or to 44 wt %, or to 42 wt %, or to 40 wt %, or to 35 wt %, or to 30 wt %, or to 25 wt %, or to 20 wt %.

In one embodiment of the invention in which the composition comprises a polymeric brominated flame retardant of a weight average molecular weight equal to or greater than 1000 grams per mole, the amount of the polymeric brominated flame retardant in the composition is typically from 70 to 17 wt %, or to 19 wt %, or to 21 wt %, or to 23 wt %, or to 25 wt %, or to 27 wt %, or to 29 wt %, or to 31 wt %, or to 33 wt %, or to 35 wt %, or to 40 wt %, or to 45 wt %, or to 50 wt %, or to 55 wt %, or to 60 wt %.

Other Halogenated Flame Retardants

In one embodiment the composition of this invention comprises at least one halogenated organic flame retardant other than the polymeric brominated flame retardant of a weight average molecular weight equal to or greater than 1000 grams per mole. Useful other halogenated organic compounds have at least one halogen atom, preferably bromine or chlorine, bonded to an aromatic or cycloaliphatic ring which can be monocyclic, bicyclic or multicyclic rings. Bromine is the preferred halogen. The halogenated compound may contain other functional groups which do not adversely affect the processing or physical characteristics of the composition. If brominated, the weight average molecular weight of the other halogenated organic compound is less than (<) 1000 g/mol.

Examples of other halogenated compounds of the above type include perchloropentacyclodecane; Diels-Alder adducts of hexachlorocyclopentadiene with "enes" such as maleic anhydride; hexabromobenzene; pentabromoethylbenzene 2,4,6-tribromophenol; tribromophenyl allyl ether; octaobromodiphenyl; poly(pentabromobenzyl)acrylate; pentabromodiphenyl ether; octabromodiphenyl ether; decabromodiphenyl ether; tetrachlorobisphenol A; tetrabromobisphenol A; bis(dibromopropyl)ether of tetrabromobisphenol A; tetrachlorophthalic anhydride; tetrabromophthalic anhydride; hexachloroendomethylenetetrahydrophthalic acid; ethylene-bis(tetrabromophthatmide); hexabromocyclododecane; and the like. Some other halogenated compounds useful in the practice of this invention are described in U.S. Pat. No. 6,936,655.

To minimize the amount of the flame retardant compound used, other halogenated compounds with high halogen contents are advantageously employed. Particularly desirable are brominated aromatic compounds having bromine contents greater than 65 weight percent and, more preferably, greater than 75 weight percent. In a highly useful embodiment, the other flame retardant compound is decabromodiphenyl ether or ethane-1,2-bis(pentabromophenyl).

The amount of other halogenated flame retardant (if present) is less than 50 wt % of the composition of the present invention.

Silanol Condensation Catalyst

In one embodiment the composition of the invention includes a silanol condensation catalyst to promote crosslinking and insure moisture cure. Silanol condensation catalysts known in the art for crosslinking alkoxysilane polymers can be employed for the compositions of the invention. Such catalysts include organic bases, carboxylic acids and organometallic compounds including organic titanates and complexes or carboxylates of lead, cobalt, iron, nickel, zinc and tin, such as dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylates, especially dibutyltindilaurate and dioctyltinmaleate, are particularly useful silanol condensation catalysts for the compositions of the invention. The silanol condensation catalyst will be present in an amount from 0.01 to 20 wt %, or from 0.025 to 10 wt %, or from 0.05 to 5 wt %, or from 0.1 to 3 wt %, based on the total weight of the composition. The silanol condensation catalyst may be introduced in the form of a masterbatch. In one embodiment the silanol condensation catalyst is a component of a masterbatch in an amount greater than 0 wt % and preferably less than 40 wt %.

Fillers and Additives

The crosslinked, silane-functionalized polyolefin product comprising a brominated, flame retardant can be filled or unfilled. If filled, then the amount of filler present should preferably not exceed an amount that would cause unacceptably large degradation of the mechanical and/or chemical properties of the silane-crosslinked, olefin polymer. Typically, the amount of filler present is between 2 and 80, preferably between 5 and 70, weight percent (wt %) based on the weight of the polymer. Representative fillers include kaolin clay, magnesium hydroxide, silica, calcium carbonate and carbon blacks. The filler may or may not have flame retardant properties. In a preferred embodiment of this invention in which filler is present, the filler is coated with a material that will prevent or retard any tendency that the filler might otherwise have to interfere with the silane cure reaction. Stearic acid is illustrative of such a filler coating. Filler and catalyst are selected to avoid any undesired interactions and reactions, and this selection is well within the skill of the ordinary artisan.

The compositions of this invention can also contain additives such as, for example, antioxidants (e.g., hindered phenols such as, for example, IRGANOX™ 1010), phosphites (e.g., IRGAFOS™ 168), UV stabilizers, cling additives, light stabilizers (such as hindered amines), plasticizers (such as dioctylphthalate or epoxidized soy bean oil), metal deactivators, scorch inhibitors, mold release agents, tackifiers (such as hydrocarbon tackifiers), waxes (such as polyethylene waxes), processing aids (such as oils, organic acids such as stearic acid, metal salts of organic acids), oil extenders (such as paraffin oil and mineral oil), colorants or pigments to the extent that they do not interfere with desired physical or mechanical properties of the compositions of the present invention. These additives are used in amounts known to those versed in the art.

Halogen-Free Flame Retardants

In one embodiment the composition of this invention comprises at least one halogen-free flame retardant (HFFR) that can inhibit, suppress, or delay the production of flames. The halogen-free flame retardants may be inorganic materials. Examples of the halogen-free flame retardants suitable for use in compositions according to this disclosure include, but are not limited to, metal hydroxides, red phosphorous, silica, alumina, titanium oxide, carbon nanotubes, talc, clay, organo-modified clay, calcium carbonate, zinc borate, antimony trioxide, wollastonite, mica, ammonium octamolybdate, frits, hollow glass microspheres, intumescent compounds, expanded graphite, and combinations thereof. In an embodiment, the halogen-free flame retardant can be selected from the group consisting of aluminum hydroxide, magnesium hydroxide, calcium carbonate, and combinations thereof.

The halogen-free flame retardant can optionally be surface treated (coated) with a saturated or unsaturated carboxylic acid having 8 to 24 carbon atoms, or 12 to 18 carbon atoms, or a metal salt of the acid. Exemplary surface treatments are described in U.S. Pat. Nos. 4,255,303, 5,034,442 and 7,514,489, US Patent Publication 2008/0251273, and WO 2013/116283. Alternatively, the acid or salt can be merely added to the composition in like amounts rather than using the surface treatment procedure. Other surface treatments known in the art may also be used including silanes, titanates, phosphates and zirconates.

Commercially available examples of halogen-free flame retardants suitable for use in compositions according to this disclosure include, but are not limited to APYRAL™ 40CD available from Nabaltec AG, MAGNIFIN™ H5 available from Magnifin Magnesiaprodukte GmbH & Co KG, and combinations thereof.

In one embodiment the HFFR will comprise 2-90, or 5-80, or 10-70, wt % of the total composition.

Inorganic flame retardants may be used in combination with halogenated flame retardants. While useful flame retardant formulations are available without such inorganic compounds, flame retardance is increased when they are included and this usually results in the use of lower levels of the halogenated compound. This latter feature is advantageous from an economic standpoint and also from the standpoint of maximizing the physical properties and processability. While an inorganic antimony flame retardant, e.g., antimony trioxide, is typically the inorganic flame retardant of choice, other known and useful (non-limiting) inorganic flame retardants include antimony pentoxide, antimony silicates, boron compounds, carbon black, calcium carbonate, metal hydrates, calcined clay, tin oxide, zinc oxide, zinc borate, zinc molybdate, zinc sulfide, aluminum trioxide and aluminum trihydroxide. The inorganic flame retardant may be coated with a material that will prevent or retard any tendency that the inorganic flame retardant might otherwise have to interfere with the silane cure reaction. Stearic acid is illustrative of such a coating material. Selection of inorganic flame retardant and catalyst is made to avoid any undesired interactions and reactions.

The weight ratio of total halogenated flame retardant to inorganic flame retardant typically ranges from 0.5:1 to 5:1 and, more typically, from 0.7:1 to 4:1, and, even more typically, from 1:1 to 3:1.

In one embodiment the composition of the invention comprises at least one inorganic antimony flame retardant. In one embodiment the at least one inorganic antimony flame retardant is antimony trioxide, antimony pentoxide, or an antimony silicate. In one embodiment the inorganic antimony flame retardant is antimony trioxide.

In one embodiment the composition of the invention comprises at least one inorganic antimony flame retardant in combination with at least one of a zinc compound, including (but not limited to) zinc oxide, zinc borate, zinc molybdate, and zinc sulfide. In one embodiment the at least one inorganic antimony flame retardant is antimony trioxide, antimony pentoxide, or an antimony silicate. In one embodiment the inorganic antimony flame retardant is antimony trioxide. In one embodiment the composition of the invention comprises antimony trioxide in combination with at least one of zinc oxide, zinc borate, zinc molybdate, and zinc sulfide. In one embodiment the inventive composition comprises an inorganic antimony flame retardant but without any of zinc oxide, zinc borate, zinc molybdate, and zinc sulfide. In one embodiment the inventive composition comprises an inorganic antimony flame retardant but without any other inorganic flame retardant.

In one embodiment the total inorganic flame retardant will comprise 3 to 80 wt %, or 5 to 70 wt %, or 10 to 60 wt %, or 15 to 50 wt %, of the composition of the invention. In one embodiment an antimony flame retardant, preferably antimony trioxide, will comprise 3 to 60 wt %, or 5 to 55 wt %, or 10 to 50 wt %, or 15 to 45 wt %, of the composition of the invention, and at least one of zinc oxide, zinc borate, zinc molybdate, and zinc sulfide will comprise zero to 20 wt %, or greater than zero to 20 wt %, or 1 to 15 wt %, or 2 to 10 wt %, of the composition of the invention.

Compositions

The compositions of this invention comprise, in weight percent based on the weight of the composition:
- (A) 20-75, or 30-70, or 35-65, or 37-60, wt % alkoxysilane functionalized polyolefin; and
- (B) 20-60, or 25-55, or 30-50, or 35-45, wt % polymeric brominated flame retardant of weight average molecular weight ≥1,000 g/mol; preferably ≥10,000 g/mol; more preferably ≥25,000 g/mol; even more preferably ≥50,000 g/mol; still more preferably ≥75,000 and most preferably ≥100,000 g/mol; and
- (C) 0.05-20, or 0.10-10, or 0.15-5, or 0.20-3, wt % silanol condensation catalyst.

The compositions of this invention exhibit one or more, or two or more, or three or more, or all four of the following properties after melt blending, fabrication and crosslinking under humid conditions at 100° C.:

The compositions of this invention exhibit at least one, or at least two, or at least three, or all four, of the following properties after melt blending, fabrication and crosslinking in a humid environment at temperatures below 100° C.:

(A) Horizontal burn performance: Total char less than (<) 100 millimeters (mm), more preferably <75 mm, most preferably <40 mm;

(B) Horizontal burn performance: Time to extinguish <80 seconds (s), preferably <40 s, more preferably <20 s, most preferably <10 s;

(C) Wet Insulation Resistance: greater than (>) 100 megaohm (Mohm), more preferably >1000 Mohm; and (D) Hot creep: <175%, preferably <100%, more preferably <75%, most preferably <50% after 4 hours (h) of aging at 90° C. water bath.

Compounding/Fabrication

Compounding of the alkoxysilane functionalized polyolefin, brominated flame retardant, silanol condensation catalyst, and optional filler and additives can be performed by standard means known to those skilled in the art. Examples of compounding equipment are internal batch mixers, such as a BANBURY™ or BOLLING™ internal mixer. Alternatively, continuous single or twin screw mixer or extruders can be used, such as a FARREL™ continuous mixer, a WERNER and PFLEIDERER™ twin screw mixer, or a BUSS™ kneading continuous extruder. The type of mixer utilized, and the operating conditions of the mixer, will affect properties of the composition such as viscosity, volume resistivity, and extruded surface smoothness.

The components of the composition are typically mixed at a temperature and for a length of time sufficient to fully homogenize the mixture but insufficient to cause the material to gel. The catalyst is typically added to silane-functionalized polyolefin but it can be added before, with or after the additives, if any. Typically, the components are mixed together in a melt-mixing device. The mixture is then shaped into the final article. The temperature of compounding and article fabrication should be above the melting point of the silane-functionalized polyolefin but below 250° C.

In some embodiments, either or both of the catalyst and the additives are added as a pre-mixed masterbatch. Such masterbatches are commonly formed by dispersing the catalyst and/or additives into an inert plastic resin, e.g., a low density polyethylene. Masterbatches are conveniently formed by melt compounding methods.

In one embodiment, one or more of the components are dried before compounding, or a mixture of components is dried after compounding, to reduce or eliminate potential scorch that may be caused from moisture present in or associated with the component, e.g., filler. In one embodiment, crosslinkable alkoxysilane functionalized polyolefin mixtures are prepared in the absence of a crosslinking, i.e., condensation, catalyst for extended shelf life, and the crosslinking catalyst is added as a final step in the preparation of a melt-shaped article.

Articles of Manufacture

In one embodiment, the composition of this invention can be applied to a cable as a sheath, semiconductor or insulation layer, in known amounts and by known methods (for example, with the equipment and methods described in U.S. Pat. Nos. 5,246,783 and 4,144,202). Typically, the composition is prepared in a reactor-extruder equipped with a cable-coating die and after the components of the composition are formulated, the composition is extruded over the cable as the cable is drawn through the die. Cure may begin in the reactor-extruder. While not necessary or preferred, the shaped article can be exposed to either or both elevated temperature and external moisture and if an elevated temperature, it is typically between ambient and up to but below the melting point of the polymer for a period of time such that the article reaches a desired degree of crosslinking. The temperature of any post-shaping cure should be above 0° C. Other articles of manufacture that can be prepared from the polymer compositions of this invention include fibers, ribbons, sheets, tapes, tubes, pipes, weather-stripping, seals, gaskets, hoses, foams, footwear and bellows. These articles can be manufactured using known equipment and techniques.

As an alternative or addition to moisture crosslinking the compositions may also be crosslinked by other means such as (but not limited to) hydroxyl terminated polydimethylsiloxane, peroxides, irradiation, and bis-sulfonyl azides.

The invention is described more fully through the following examples. Unless otherwise noted, all parts and percentages are by weight.

EXAMPLES

Test Methods

Density is measured according to ASTM D-792.

Crystallinity at room temperature of ethylene homopolymers and ethylene alpha olefin copolymers is calculated using the following equation:

$$\text{Wt \% Cryst.} = \frac{\rho_c}{\rho}\left(\frac{\rho - \rho_a}{\rho_c - \rho_a}\right)$$

where, $\rho$=Density of ethylenic polymer (grams/cc at 23° C.)

$\rho_a$=Density of amorphous fraction (0.855 g/cc)

$\rho_c$=Density of crystalline fraction (1.00 g/cc)

Crystallinity of any ethylenic polymer is measured as follows: Determine melting peaks and percent (%) or weight percent (wt %) crystallinity of ethylenic polymer using Differential Scanning calorimeter (DSC) instrument DSC Q1000 (TA Instruments).

(A) Baseline calibrate instrument. Use software calibration wizard. First obtain a baseline by heating a cell from −80° to 280° C. without any sample in an aluminum DSC pan. Then use sapphire standards as instructed by the calibration wizard. The analyze 1 to 2 milligrams (mg) of a fresh indium sample by heating the standards sample to 180° C., cooling to 120° C. at a cooling rate of 10° C./minute, then keeping the standards sample isothermally at 120° C. for 1 minute, followed by heating the standards sample from 120° to 180° C. at a heating rate of 10° C./minute. Determine that indium standards sample has heat of fusion=28.71±0.50 Joules per gram (J/g) and onset of melting=156.6°±0.5° C.

(B) Perform DSC measurements on test samples using same DSC instrument. Press test sample of semi-crystalline ethylenic polymer into a thin film at a temperature of 160° C. Weigh 5 to 8 mg of test sample film in DSC pan. Crimp lid on pan to seal pan and ensure closed atmosphere. Place sealed pan in DSC cell, equilibrate cell at 30° C., and heat at a rate of about 100° C./minute to 190° C., keep sample at 190° C. for 3 minutes, cool sample at a rate of 10° C./minute to −60° C. to obtain a cool curve heat of fusion (Hf), and keep isothermally at −60° C. for 3 minutes. Then heat sample again at a rate of 10° C./minute to 190° C. to obtain a second heating curve heat of fusion (ΔHf). Using the second heating curve, calculate the "total" heat of fusion (J/g) by integrating from −20° C. (in the case of ethylene homopolymers, copolymers of ethylene and hydrolysable silane monomers, and ethylene alpha olefin copolymers of density greater than or equal to 0.90 g/cm$^3$) or −40° C. (in the case of copolymers of ethylene and unsaturated esters, and ethylene alpha olefin copolymers of density less than 0.90 g/cm$^3$) to end of melting. Using the second heating curve, calculate the "room temperature" heat of fusion (J/g) from 23° C. (room temperature) to end of melting by dropping perpendicular at 23° C. Measure and report "total crystallinity" (computed from "total" heat of fusion) as well as "crystallinity at room temperature" (computed from "room temperature" heat of fusion). Crystallinity is measured and reported as percent (%) or weight percent (wt %) crystallinity of the polymer from the test sample's second heating curve heat of fusion (ΔHf) and its normalization to the heat of fusion of 100% crystalline polyethylene, where % crystallinity or wt % crystallinity=(ΔHf*100%)/292 J/g, wherein ΔHf is as defined above, * indicates mathematical multiplication, / indicates mathematical division, and 292 J/g is a literature value of heat of fusion (ΔHf) for a 100% crystalline polyethylene.

Melt index, or $I_2$, is measured in accordance with ASTM D1238, condition 190° C./2.16 kg, and is reported in grams eluted per 10 minutes.

Limiting Oxygen Index (LOI)

The LOI is the minimum concentration of oxygen, expressed as a percentage that will support combustion of a polymer. It is measured by passing a mixture of oxygen and nitrogen over a burning specimen, and reducing the oxygen level until a critical level is reached. The LOI values reported here are measured by the ASTM D2863 test method.

Horizontal Burn

Where any specimen emits flaming or glowing particles or flaming drops at any time that ignite the cotton (flameless charring of the cotton is to be ignored), the wire, cable, or assembly is to be judged capable of conveying flame to combustible materials in its vicinity. Where any specimen emits flaming or glowing particles or flaming drops at any time that fall outside the area of the testing surface covered by the cotton and/or fall onto the wedge or burner, the test results are to be discarded and the test is to be repeated. For the repeat test, the cotton is to cover an area of the testing surface 12 inches or 305 mm wide by 14 inches or 355 mm deep centered on the horizontal axis of the specimen and the specified cotton is to be clamped or otherwise secured to the wedge (no cotton under the wedge) and around the base of the burner. None of the cotton is to ignite in the repeat test nor is the specimen to char for a total length greater than 3-15/16 in or 100 mm. The horizontal burn values reported here are measured by the UL 1581,1100.4 test method.

Hot Creep

The hot creep test is conducted with wires using 0.2 MPa at 150° C. Three specimens are tested and the average value is reported for each sample. The hot creep values reported here are measured by the UL 2556 test method.

An unstretched specimen is placed in the jaws of the preheated support apparatus. Maximum distance between jaws is 4.0-inches (101.6 mm). The calculated weight is attached to the bottom of the sample. After 15 minutes exposure, and without removing the specimen from the oven, the distance between gauge marks is measured and recorded. If a specimen breaks or stretches to the bottom of the oven, the specimen has failed the test.

Dry and Wet Insulation Resistance (IR and Wet IR)

The samples for dry insulation resistance, or simply IR, testing, and wet IR testing, or wet IR, are prepared using the BRABENDER™ extruder. Typically a 10 meter (m) length wire is used for both. Before testing, both ends of the jacketing on the coated wire are peeled off about 1.5 cm and the copper strands twisted together. The wire is immersed in distilled water and 500 volts (V) of direct current (DC) are applied between the conductor and the water during testing for both IR and wet IR. For IR, it is measured by withstand voltage tester after applying the DC for one minute. For wet IR, wire is immersed in water grounded previously for 1 hour and then measured in the same manner. The IR and wet IR values reported here are measured by the UL 44 standard.

ACBD After Glancing Impact Test Protocol requires securing to one of the broad faces of a hard oak board measuring approximately 50 mm by 100 mm in cross section both ends of each of six 380-millimeter (mm) specimens of finished solid No. 14 AWG Type XHHW wire without damage to the insulation and in a manner that results in the wires being straight and parallel to the longitudinal axis of the board. The board is rigidly supported with the plane formed by the wires inclined 45° from the horizontal and each wire in a vertical plane. A weight of 0.454 kilogram (kg) consisting of a solid right-circular steel cylinder that is 20 mm in diameter, has all surfaces smooth, and has one end rounded to a hemisphere is supported with its longitudinal axis vertical and in a vertical plane containing one of the wires. The hemispherical end is to be down and centered 460 mm above the midpoint of the length of the wire. A straight vertical tube having a 22-mm inside diameter is to surround the cylinder and serve as a guide to keep the cylinder vertical while the cylinder is falling and after it has hit the wire. The inside surface of the guide tube is to be smooth and the tube is of a length that keeps the cylinder from coming out of the guide tube.

While the specimen of wire, the apparatus, and the surrounding air are in thermal equilibrium with one another at a temperature of 24.0±8.0° C., the cylinder is released, fall freely in the guide tube, and strike the wire once, and is then immediately to be raised back up to and secured at the 460-mm height. This process is repeated for each of the five remaining specimens of wire. Each of the impacted specimen has its impacted area immersed in tap water that is at a temperature of 24.0±8.0° C. The water is in a plastic container and is grounded via a suspended metal rod (or in an earth-grounded metal container whose inside metal surface is directly and entirely in contact with the water, but not painted, enameled, or otherwise insulated). The insulation in the impacted area of each specimen is stressed electrically to breakdown by means of a 48-62 Hertz (Hz) potential applied between the conductor in the specimen and the earth-grounded water container. The test potential is supplied by a transformer complying with UL 1581 paragraph 820.1.

The applied potential is increased from near zero to an essentially uniform rate that (i) is not less than 100 percent of the voltage rating for the product in 60 seconds (s) and (ii) is not more than 100 percent in 10 s. The rate of increase is not to exceed 500 volts per second (V/s) in any case. The increase continues in this manner until breakdown occurs. The breakdown potential for each of the six impacted specimens is recorded. Each of six 380-mm or longer wire specimens not subjected to the impact is subjected to the dielectric-breakdown procedure with the center portion of its length immersed in water as described above. The breakdown potential is to be recorded for each of these specimens and the average of these potentials is calculated and recorded (excluding the highest and lowest values measured after glancing impact).

The average breakdown potential of finished solid No. 14 AWG Type XHHW wire that have separately been subjected to a glancing impact of 2 Joules (J) or 0.207 meters per kilogram/force (m-kgf) shall not be less than 20 percent of the average breakdown potential of six adjacent specimens of the same wire not subjected to the impact.

Tensile strength and elongation at break are measured according to UL 2556 Section 3.5 using a device that indicates the actual maximum load at which the specimen breaks. The device shall operate a power-actuated jaw at speeds of 12 to 305 mm/min and a precision of 20% of the set speed. Three samples are prepared from the finished wire by removing the insulation from the conductor without damaging the polymer sheath. The specimens are straightened and cut to a length sufficient to allow a space of 0.3 m between the jaws of the testing machine when the specimen is in the initial test position. The straight specimen shall be gauge marked at two points 250±2 mm (10±0.08 in) apart. The specimen shall be gripped in the jaws of the machine with the gauge marks between the jaws, and the jaws shall be caused to separate at the rate indicated in Table 2 until the specimen breaks. In order to be accepted as valid, the break shall take place between the gauge marks and shall be no closer than 25 mm (1 in) to either gauge mark. The maximum load before break shall be recorded. The distance between the gauge marks at the time of break shall be recorded to the nearest 2 mm (0.08 in).

Crush resistance is measured according to UL 2556 Section 7.11 using a power driven compression machine capable of measuring the compression force at rupture to an accuracy of 2%. The device shall operate at a power-actuated jaw speed of 10±1 mm/min (0.5±0.05 in/min), employing two flat steel plates 50 mm (2 in.) wide and a 30 Volts DC power with a means of indicating contact between the wire conductor and the steel plate. A 2500 mm (100 in) sample, with one end of the conductor made bare and connected to one side of the power plate, is placed between the horizontally mounted steel plates in the compression machine. The first test point on the specimen is centered on the lower plate and parallel to the 50 mm (2 in) dimension. The upper steel plate is lowered until contact is made with the surface of the specimen. The downward motion of the plate is continued at the specified rate until the indicator signals contact.

The force indicated by the compression machine at the moment of contact is then recorded. The procedure is repeated at nine additional test points at least 250 mm (10 in) apart and at least 125 mm (5 in) from either end of the specimen. The average of the ten measurements is reported and must equal or exceed 1200 psi to be considered a passing result. The crush resistance values reported are the ultimate values, not those from an initial peak (if any exists).

Materials

AMPLIFY™ EA 100 Functional Polymer is an ethylene ethyl acrylate copolymer containing 15% by weight of units derived from ethyl acrylate and having melt index ($I_2$) of 1.3 g/10 min.

DOW™ Electrical & Telecommunications DFDA-7530 NT is a linear low density polyethylene of 0.922 g/cm$^3$ density and 0.7 g/10 min melt index ($I_2$), and is commercially available from The Dow Chemical Company, Midland, Mich., USA.

SI-LINK™ DFDA-5451 NT is an ethylene-silane copolymer having a density of 0.922 g/cm$^3$, a melt index ($I_2$) of 1.5 g/10 min, and is commercially available from The Dow Chemical Company, Midland, Mich., USA.

SI-LINK™ DFDA-5481 NT is a catalyst masterbatch containing a blend of 1-butene/ethene polymer, ethene homopolymer, phenolic compound antioxidant, dibutyltin dilaurate (DBTDL) (a silanol condensation catalyst), and a phenolic hydrazide compound.

SI-LINK™ AC DFDB-5451 NT is a scorch-retardant ethylene-silane copolymer having a density of 0.922 g/cm$^3$ a melt index ($I_2$) of 1.5 g/10 min, and is commercially available from The Dow Chemical Company, Midland, Mich., USA.

SAYTEX™ 8010 is decabromodiphenyl ethane available from Albemarle. It has a bromine content of 82.3 wt % and a Mw of 971 g/mol.

EMERALD Innovation™ 1000 is a brominated polyphenyl ether available from Chemtura Corporation. It has a bromine content of 78 wt % and is of relatively high-molecular weight.

EMERALD Innovation™ 3000 is a brominated styrene/butadiene block copolymer available from Chemtura Corporation. It has a bromine content is 64 wt % and Mw from 100,000 to 160,000 g/mol.

MICROFINE™ A09 is standard grade antimony trioxide available from Great Lakes (Chemtura Group).

MB 54 is a masterbatch containing 97 wt % AMPLIFY™ EA 100 Functional Polymer and 3 wt % of CHIMASORB™ 119, a hindered amine light stabilizer available from BASF.

IRGANOX™ 1010 is a sterically hindered phenolic primary antioxidant, i.e., pentaerythritol tetrakis(3-(3,5-di-tert-butyl-4-hydroxyphenyl)propionate), available from BASF.

Test Specimen Preparation

Protocol for Preparing Compositions Listed in Table 1, Table 6 and Table 10 in a Mixing Bowl The compositions are prepared using a 420 mL BRABENDER™ mixing bowl with cam rotors. The batch mass is calculated to provide 70% fill of the mixing bowl with the flame retardant formulations. The mixing bowl is pre-heated to a set temperature of 125° C. and the rotor speed set to 25 revolutions per minute (rpm). Half of the polymer is added to the bowl and fluxed until a polymer melt is formed. Next, the flame retardant is added and incorporated into the polymer melt. The remaining amounts of polymers and antioxidants are then added and the rotor speed is increased to 40 rpm. The batch is allowed to flux for an additional 5 minutes. Upon removal from the mixing bowl the formulation is placed in a cold press for 5 minutes. The resulting plaque is cut into smaller pieces which are placed in a 8 inch×8 inch×150 mil mold and compression molded at the following conditions: 125° C. for 5 minutes at 500 psi, followed by 2500 psi for 5 minutes, and subsequently slow cooling at this pressure until the mold temperature reaches 40° C. The compression molded plaque is then guillotined into strips and placed in a Wiley mill to produce small chips. The chips are then fed to a BRABENDER™ model Prep Mixer/Measuring Head laboratory electric batch mixer equipped with 24:1 extruder. A 24:1 Maddox mixing head screw is employed to convey and melt the polymer through a stranded die (at 40 rpm screw speed, using a 20/40/60/20 mesh screen pack and a flat set temperature profile of 140° C. across zone 1, zone 2, zone 3 and die). The strand extrudate is again Wiley milled to produce pellets. These compositions are all thermoplastic and can be used to make thermoplastic flame-retardant sheaths of wire constructions, as well as flame-retardant masterbatches in blends with other components.

Protocol for Preparing Coated Wire Test Specimens Listed in Table 2, Table 7 and Table 11

A 3-zone barrel, 25:1 L/D (length to diameter), ¾" BRABENDER™ extruder with a 0.050 inch tip and a 0.125 die is used with a 3:1 compression ratio screw with MADDOX™ mixing head. A breaker plate and 40 mesh screen pack is used. The bare copper conductor is 14 AWG/single strand with nominal diameter of 0.064 inches. The zone temperatures are set at 150° C. for all zones including the die. Wire coated samples are immediately cooled in a water trough that resides 4-5 inches from die.

Vacuum dried samples are extruded with a screw speed ranging of 40 rpm. Coated wire samples are collected on a moving conveyor belt. The conveyor belt speed is set at about 8 feet per minute. The belt is adjusted to obtain a target diameter of 0.124 inches which means a wire coating thickness of approximately 0.030 inches or 30 mils. A minimum of 60 feet of coated wire samples are collected of each sample for further testing and evaluation.

Note that, in the case of Comparative Examples 11 and 12 of Table 7, which are aimed at mimicking the Monosil process for in situ silane grafting, the liquid additives (VTMS and LUPEROX™ 101 peroxide) are soaked into the DOW™ Electrical & Telecommunications DFDA-7530 NT linear low density polyethylene resin. This is done by preheating the resin at 70° C. for one hour in a glass jar followed by addition of VTMS and LUPEROX™ 101 and tumble mixing for 10 minutes. The glass jar with the mixture is left in the oven overnight to complete the soaking. The resulting soaked resin is then physically blended with other components and then melt mixed during extrusion to make wire constructions on 14 AWG solid copper with a nominal 30 mil wall thickness.

Test Results

The thermoplastic and moisture-crosslinkable flame-retardant compositions of these Examples are reported in Tables 1 and 2, respectively.

TABLE 1

Thermoplastic Flame-Retardant Compositions

|  | Comp Ex 1 | Comp Ex 2 | Comp Ex 3 | Comp Ex 4 | Inventive Ex 1 | Inventive Ex 2 | Inventive Ex 3 | Inventive Ex 4 |
|---|---|---|---|---|---|---|---|---|
| Name Description | FR MB 1 15 wt % (Saytex 8010) | FR MB 2 30 wt % (Saytex 8010) | FR MB 3 45 wt % (Saytex 8010) | FR MB 4 60 wt % (Saytex 8010) | FR MB 5 15 wt % (Emerald Innovation 1000) | FR MB 6 30 wt % (Emerald Innovation 1000) | FR MB 7 45 wt % (Emerald Innovation 1000) | FR MB 8 60 wt % (Emerald Innovation 1000) |
| AMPLIFY™ EA 100 Functional Polymer | 79.55 | 59.55 | 39.55 | 19.55 | 64.55 | 49.55 | 34.55 | 19.55 |
| SAYTEX™ 8010 | 15.00 | 30.00 | 45.00 | 60.00 |  |  |  |  |
| EMERALD INNOVATION™ 1000 |  |  |  |  | 15.00 | 30.00 | 45.00 | 60.00 |
| MICROFINE AO9 | 5.00 | 10.00 | 15.00 | 20.00 | 20.00 | 20.00 | 20.00 | 20.00 |
| MB54 | 0.40 | 0.40 | 0.40 | 0.40 | 0.40 | 0.40 | 0.40 | 0.40 |
| IRGANOX™ 1010 | 0.05 | 0.05 | 0.05 | 0.05 | 0.05 | 0.05 | 0.05 | 0.05 |
| Total, wt % | 100.00 | 100.00 | 100.00 | 100.00 | 100.00 | 100.00 | 100.00 | 100.00 |

TABLE 2

Moisture-Crosslinkable Flame Retardant Compositions

| Name | Comp Ex 5 | Comp Ex 6 | Comp Ex 7 | Comp Ex 8 | Inventive Ex 5 | Inventive Ex 6 | Inventive Ex 7 | Inventive Ex 8 |
|---|---|---|---|---|---|---|---|---|
| DFDA-5451 | 45 | 45 | 45 | 45 | 45 | 45 | 45 | 45 |
| Comp Ex 1 FR MB | 50.00 |  |  |  |  |  |  |  |
| Comp Ex 2 FR MB |  | 50.00 |  |  |  |  |  |  |
| Comp Ex 3 FR MB |  |  | 50.00 |  |  |  |  |  |
| Comp Ex 4 FR MB |  |  |  | 50.00 |  |  |  |  |
| Inventive Ex 1 FR MB |  |  |  |  | 50.00 |  |  |  |
| Inventive Ex 2 FR MB |  |  |  |  |  | 50.00 |  |  |
| Inventive Ex 3 FR MB |  |  |  |  |  |  | 50.00 |  |
| Inventive Ex 4 FR MB |  |  |  |  |  |  |  | 50.00 |
| DFDA-5481 NT | 5 | 5 | 5 | 5 | 5 | 5 | 5 | 5 |
| Total | 100 | 100 | 100 | 100 | 100 | 100 | 100 | 100 |
| Crush, lbf | 1228 | 1024 | 1050 | 1071 | 1804 | 1455 | 1323 | 1601 |

Figure 1A:
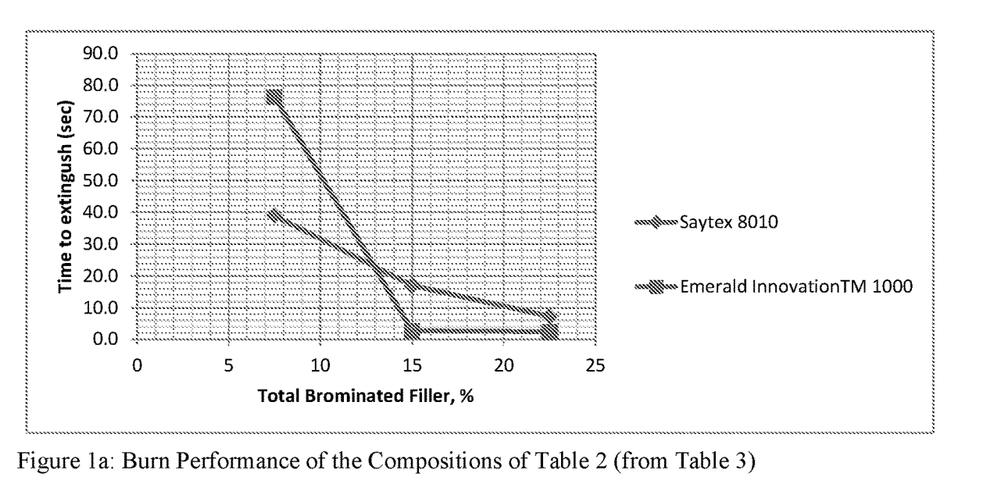
FIGS. 1a and 1b are line graphs of burn performance of the compositions of Table 2 as reported in Table 3.
Figure 1B:
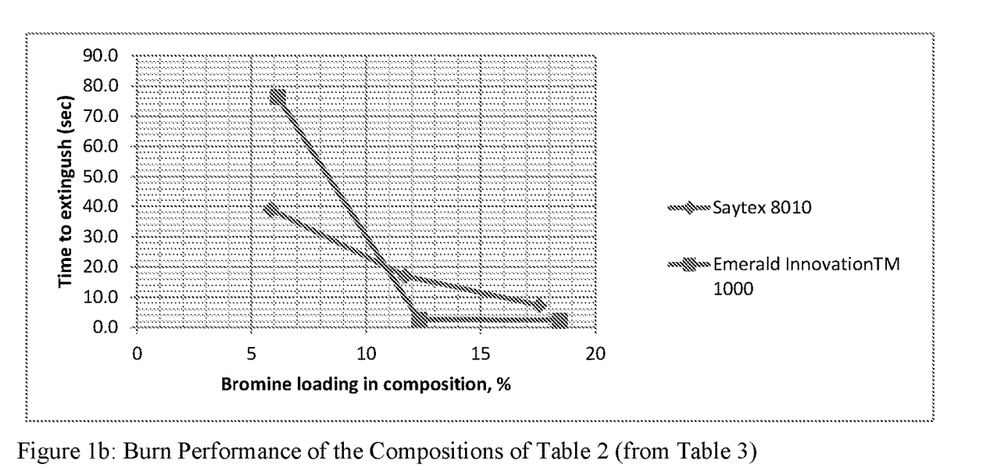

Table 3 reports unexpected improvement in horizontal burn performance with EMERALD INNOVATION™ 1000 polymeric flame retardant filler as compared to monomeric brominated small molecule flame retardant filler (SAYTEX™ 8010, Mw of 956 g/mol). For instance, in order to get to time to extinguish of 10 s, you would need about 14 wt % of EMERALD INNOVATION™ 1000 filler versus about 20 wt % of SAYTEX™ 8010 filler. In other words you need about 11 wt % of bromine vs. 16.4 wt % of bromine when using EMERALD INNOVATION™ 1000 vs. SAYTEX™ 8010, respectively, to get to 10 second time to extinguish in horizontal burn. The data from Table 3 is presented graphically in FIGS. 1a and 1b.

TABLE 3

Horizontal Burn Test Performance of Coated Conductors Made from the Compositions of Table 2

| Burner at 20° angle to horizontal sample. Failure occurs when either cotton ignites or samples chars in excess of 100 mm (UL 1581, 1100.4). | | Total Char (mm) | Time to extinguish (sec) | Bromine loading in composition, % | Brominated filler loading, % |
| --- | --- | --- | --- | --- | --- |
| Comp Ex 5 | 7.5 wt % brominated filler (SAYTEX ™ 8010) in composition | 57.7 | 39.0 | 5.85 | 7.5 |
| Comp Ex 6 | 15 wt % brominated filler (SAYTEX ™ 8010) in composition | 45.0 | 17.0 | 11.7 | 15 |
| Comp Ex 7 | 22.5 wt % brominated filler (SAYTEX ™ 8010) in composition | 40.0 | 7.3 | 17.55 | 22.5 |
| Inventive Ex 5 | 7.5 wt % brominated filler (EMERALD INNOVATION ™ 1000) in composition | 96.7 | 76.3 | 6.15 | 7.5 |
| Inventive Ex 6 | 15 wt % brominated filler (EMERALD INNOVATION ™ 1000) in composition | 36.7 | 2.7 | 12.3 | 15 |
| Inventive Ex 7 | 22.5 wt % brominated filler (EMERALD INNOVATION ™ 1000) in composition | 38.3 | 2.3 | 18.45 | 22.5 |

Table 4 reports the limiting oxygen index for various comparative and inventive examples. This is a very common method to characterize various flame retardant fillers. A higher LOI value indicates better burn performance. Based on LOI data alone one skilled in the art would actually incorrectly rate EMERALD INNOVATION™ 1000 as worst performer as compared to SAYTEX™ 8010. However, based on the horizontal burn data we know that at 60 wt % filler loading, even though LOI value for sample made with EMERALD INNOVATION™ 1000 is lower by about 10%, both the char length and time to extinguish are lower for EMERALD INNOVATION™ 1000 sample. However, this is seen at a lower absolute level of bromine which acts as a flame retardant in these brominated fillers.

TABLE 4

LOI Values of the Thermoplastic Flame-Retardant Compositions of Table 1

| | LOI, % |
| --- | --- |
| Comp Ex 1 | 27 |
| Comp Ex 2 | 30 |
| Comp Ex 3 | 35 |
| Comp Ex 4 | 44 |
| Inventive Ex 1 | 27 |

TABLE 4-continued

LOI Values of the Thermoplastic Flame-Retardant Compositions of Table 1

| | LOI, % |
| --- | --- |
| Inventive Ex 2 | 32 |
| Inventive Ex 3 | 31 |
| Inventive Ex 4 | 39 |

Table 5 reports that die pressure is lower with samples comprising EMERALD INNOVATION™ 1000 as compared with samples comprising SAYTEX™ 8010. When corrected for the amount of bromine in the formulation, a pressure drop of more than 10% is observed.

TABLE 5

Extrusion Performance of Moisture-Crosslinkable Flame-Retardant Compositions of Table 2

| | Pressure, psi | MELT TEMP. ° C. | % reduction in die pressure | Corrected % reduction in die pressure as wt % Bromine |
| --- | --- | --- | --- | --- |
| Comp Ex 5 | 1250 | 209 | 100 | 100 |
| Comp Ex 7 | 1570 | 197 | 100 | 100 |
| Inventive Ex 5 | 1180 | 209 | 94.4 | 89.8 |
| Inventive Ex 7 | 1510 | 198 | 96.2 | 91.5 |

Figure 2A:
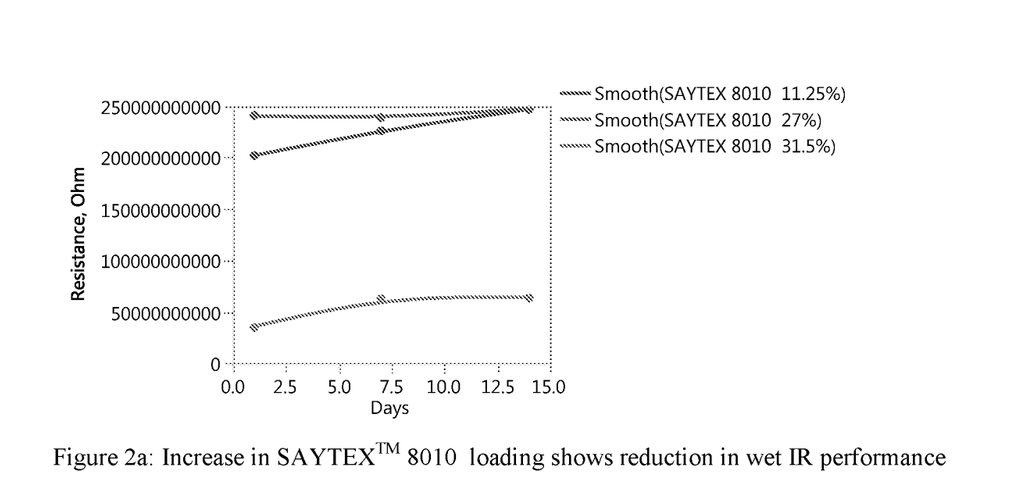
FIG. 2a is a line graph that shows an increase in SAY-TEX™ 8010 loading produces a reduction in wet IR performance.
Figure 2B:
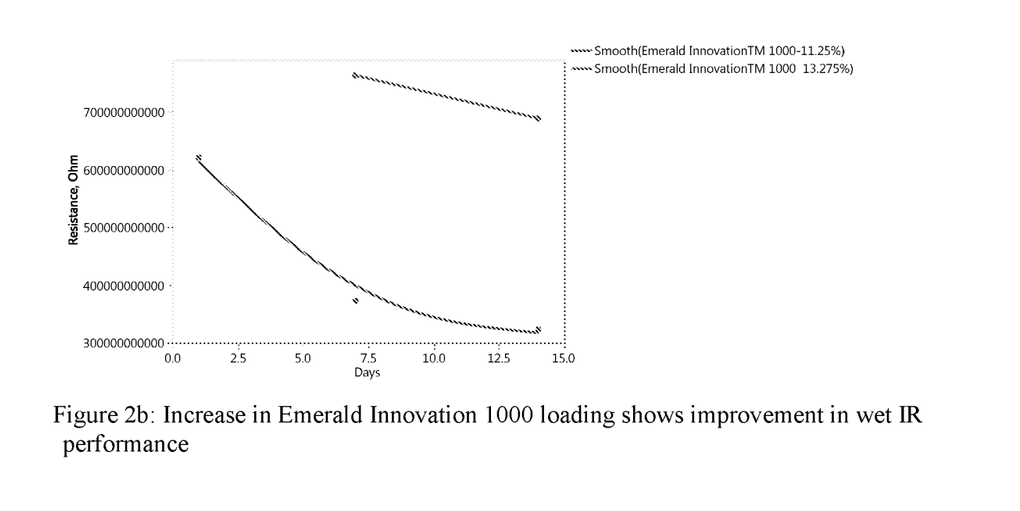
FIG. 2b is a line graph that shows an increase in EMERALD INNOVATION™ 1000 loading produces an improvement in wet IR performance.
Figure 2C:
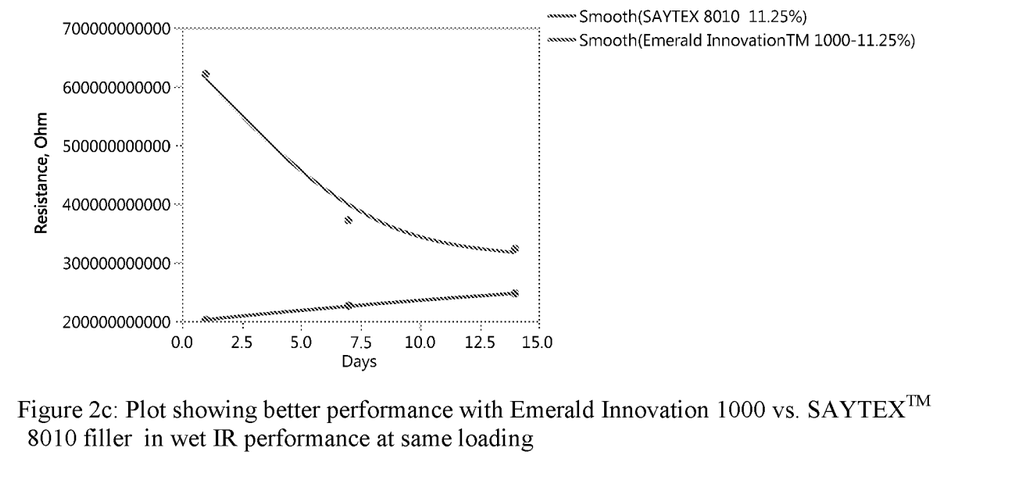
FIG. 2c is a line graph that shows better wet IR performance of EMERALD INNOVATION™ 1000 as compared to SAYTEX™ 8010 at the same loading.

Tables 6-8 and FIGS. 2a-2c report IR and wet IR performance of the compositions of Tables 1 and 2. As the SAYTEX™ 8010 filler loading is increased, a drop in wet IR performance is observed and this is consistent with the expectation for a brominated filler. However, as the EMERALD INNOVATION™ 1000 filler loading is increased, wet IR performance improves which is counter-intuitive and surprising. FIG. 2c shows that EMERALD INNOVATION™ 1000 performs better than SAYTEX™ 8010 at similar loadings (first data point excluded as an outlier).

TABLE 6

Thermoplastic Flame-Retardant Compositions

|   | Comp Ex 9 FR MB 9 | Inv Ex 9 FR MB 10 | Inv Ex 10 FR MB 11 | Inv Ex 11 FR MB 12 |
|---|---|---|---|---|
| AMPLIFY ™ EA 100 Functional Polymer | 39.55 | 39.55 | 36.48 | 28.76 |
| Saytex 8010 | 45 | | | |
| Emerald Innovation 1000 (78 wt % Bromine, Br) | | 45 | 47.3 | 53.09 |
| Microfine AO9 | 15 | 15 | 15.77 | 17.7 |
| MB-54 | 0.4 | 0.4 | 0.4 | 0.4 |
| Irganox 1010 | 0.05 | 0.05 | 0.05 | 0.05 |

TABLE 7

Moisture-Crosslinkable Flame Retardant Compositions

|   | Comp Ex 10 | Comp Ex 11 | Comp Ex. 12 | Inv Ex 12 | Inv Ex 13 | Inv Ex 14 |
|---|---|---|---|---|---|---|
| DFDB-5451 | 70 | | | 70 | 70 | 70 |
| DFDA-7530 (pre-soaked with 1.5% VTMS, 0.1% peroxide) | | 35 | 25 | | | |
| DFDA-5481 NT (Cat MB) | 5 | 5 | 5 | 5 | 5 | 5 |
| FR MB 9 | 25 | 60 | 70 | | | |
| FR MB 10 | | | | 25 | | |
| FR MB 11 | | | | | 25 | |
| FR MB 12 | | | | | | 25 |

TABLE 8

Wet Insulation Resistance in 90° C. Water of Wires (Insulated Conductors) Made from the Compositions of Table 7

| Days | Comp Ex. 10 SAYTEX ™ 11.25% | Comp Ex 11 SAYTEX ™ 27% | Comp Ex. 12 SAYTEX ™ 31.5% | Inv Ex 12 EMERALD ™ 1000-11.25% | Inv Ex 13 EMERALD ™ 11.825% | Inv Ex 14 EMERALD ™ 13.275% |
|---|---|---|---|---|---|---|
| 1 | 2.02E+11 | 2.41E+11 | 3.46E+10 | 6.21E+11 | 7.87E+11 | |
| 7 | 2.26E+11 | 2.39E+11 | 6.25E+10 | 3.72E+11 | 4.94E+11 | 7.64E+11 |
| 14 | 2.47E+11 | 2.48E+11 | 6.30E+10 | 3.23E+11 | 4.29E+11 | 6.89E+11 |

Table 9 reports the mechanical and flame-retardant properties of coated wires made from the compositions of Table 7. Improved hot creep performance is observed with EMERALD INNOVATION™ 1000 vs. SAYTEX™ 8010 while still maintaining good mechanicals. No trade-off is seen with the use EMERALD INNOVATION™ 1000 and a benefit is gained with respect to burn and electrical performance.

TABLE 9

Mechanical and Flame-Retardant Properties of Coated Wires Made from the Compositions of Table 7

| Raw Material | Comparative Ex 10 | Inventive Ex 12 |
|---|---|---|
| FR MB 9 | 25 | |
| FR MB 10 | | 25 |
| DFDB-5451 | 70 | 70 |
| DFDA-5481 NT (Catalyst MB) | 5 | 5 |
| Total | 100 | 100 |
| Testing on wire | | |
| Horizontal Burn-UL 1581 | Pass | Pass |
| Cure-Hot Creep, % | 39 | 33 |
| Peak Stress, psi (spec > 1500 psi) | 2332 | 2475 |

TABLE 9-continued

Mechanical and Flame-Retardant Properties of Coated Wires
Made from the Compositions of Table 7

| Raw Material | Comparitive Ex 10 | Inventive Ex 12 |
|---|---|---|
| Strain at Break, % (spec > 150%) | 362 | 355 |
| Retained Peak Stress, % (7 days @ 121° C.) | 113 | 106 |
| Retained Strain at Break, % (7 days @ 121° C.) | 89 | 85 |

Tables 10 and 11 report the thermoplastic and moisture-crosslinkable compositions used in Comparative Examples (Comp Ex) 13-20 and Inventive Examples (Inv Ex) 15-22.

TABLE 10

Thermoplastic Flame Retardant Compositions of Comparative Examples 13-16 and Inventive Examples 15-18

| Component | Comp Ex 13 | Comp Ex 14 | Comp Ex 15 | Comp Ex 16 | Inv Ex 15 | Inv Ex 16 | Inv Ex 17 | Inv Ex 18 |
|---|---|---|---|---|---|---|---|---|
| AMPLIFY ™ EA 100 Functional Polymer | 79.55 | 59.55 | 39.55 | 19.55 | 79.55 | 59.55 | 39.55 | 19.55 |
| Saytex 8010 | 15.00 | 30.00 | 45.00 | 60.00 | | | | |
| Emerald Innovation 3000 | | | | | 15.00 | 30.00 | 45.00 | 60.00 |
| Microfine AO9 | 5.00 | 10.00 | 15.00 | 20.00 | 5.00 | 10.00 | 15.00 | 20.00 |
| MB54 | 0.40 | 0.40 | 0.40 | 0.40 | 0.40 | 0.40 | 0.40 | 0.40 |
| Irganox 1010 | 0.05 | 0.05 | 0.05 | 0.05 | 0.05 | 0.05 | 0.05 | 0.05 |
| Total | 100.00 | 100.00 | 100.00 | 100.00 | 100.00 | 100.00 | 100.00 | 100.00 |

TABLE 11

Moisture-Crosslinkable Flame Retardant Compositions of Comparative Examples 17-20 and Inventive Examples 19-22

| Component | Comp Ex 17 | Comp Ex 18 | Comp Ex 19 | Comp Ex 20 | Inv Ex 19 | Inv Ex 20 | Inv Ex 21 | Inv Ex 22 |
|---|---|---|---|---|---|---|---|---|
| DFDA-5451 | 45 | 45 | 45 | 45 | 45 | 45 | 45 | 45 |
| Comparative Ex 13 | 50 | | | | | | | |
| Comparative Ex 14 | | 50 | | | | | | |
| Comparative Ex 15 | | | 50 | | | | | |
| Comparative Ex 16 | | | | 50 | | | | |
| Inventive Ex 15 | | | | | 50 | | | |
| Inventive Ex 16 | | | | | | 50 | | |
| Inventive Ex 17 | | | | | | | 50 | |
| Inventive Ex 18 | | | | | | | | 50 |
| DFDA- 5481 Cat MB | 5 | 5 | 5 | 5 | 5 | 5 | 5 | 5 |
| | 100 | 100 | 100 | 100 | 100 | 100 | 100 | 100 |

Figure 3:
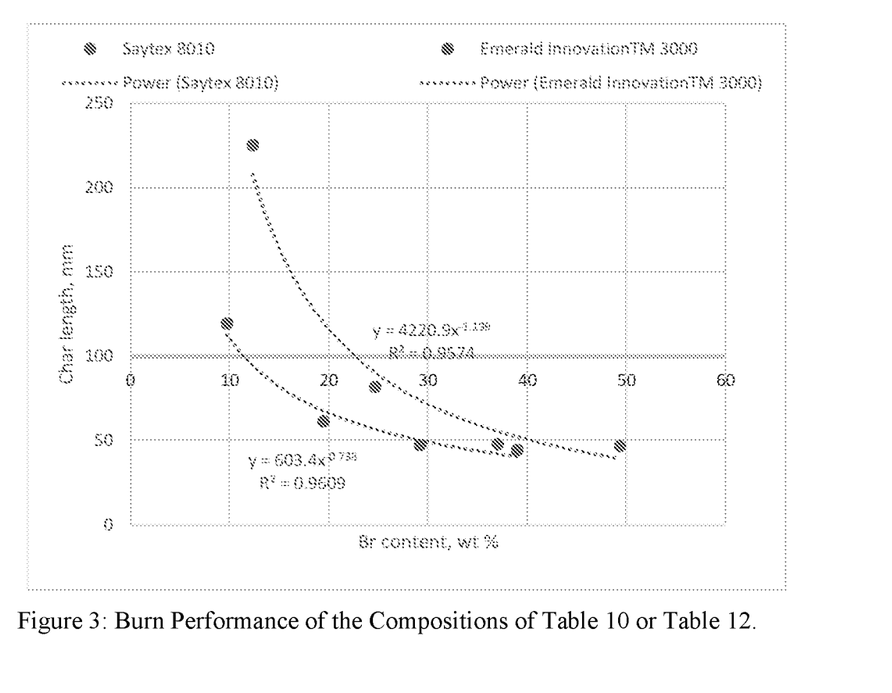
FIG. 3 is a line graph reporting the burn performance of the compositions of Tables 10 and 12.

Tables 12 and 13 and FIG. 3 report the mechanical and flame retardant properties of the compositions reported in Tables 10 and 11. The data in Table 12 shows that to get to a passing horizontal burn, a bromine content of 11 wt % is needed which corresponds to about 17 wt % of EMERALD INNOVATION™ 3000 as compared to a bromine content of 23 wt % which requires about 28 wt % SAYTEX™ 8010. This means that 40% less filler is needed to achieve a passing horizontal burn performance if EMERALD INNOVATION™ 3000 is the filler. Moreover, EMERALD INNOVATION™ 3000 provides reduced char length than SAYTEX™ 8010 notwithstanding that the sample did not pass the horizontal burn test at the lowest filler loading.

As for the mechanicals, crush resistance and glancing impact performance improve as the filler level is increased. For instance, the crush resistance values are above 1600 pound-foot (lbf) for all filler levels above 30 wt % with EMERALD INNOVATION™ 3000 vs. SAYTEX™ 8010 and is comparable at lower levels. Similarly, retained breakdown strength after glancing impact is higher at 30% of higher filler levels of EMERALD INNOVATION™ 3000 vs SAYTEX™ 8010 and is comparable at lower levels. This gives a desirable overall balance of mechanical and burn performance at a given filler loading.

TABLE 12

Crush Resistance, Glancing Impact Performance and Flame-Retardant Properties of Coated Wires Made from the Compositions of Table 10

| Component | CompEx 13 | Comp Ex 14 | Comp Ex 15 | Comp Ex 16 | Inv Ex 15 | Inv Ex 16 | Inv Ex 17 | Inv Ex 18 |
|---|---|---|---|---|---|---|---|---|
| Crush summary | | | | | | | | |
| Crush Resistance, lbf | 1520.5 | 1346.6 | 1487.4 | 1558.3 | 1500.2 | 1843.0 | 1814.9 | 1741.4 |
| Horizontal Burn Summary - Failure occurs when either cotton ignites or samples chars in excess of 100 mm | | | | | | | | |
| Ignite Cotton (# yes/total) | No | No | No | No | No | No | No | No |
| Average Total Char (mm) | 225 | 81.67 | 47.67 | 46.67 | 119.33 | 61.33 | 47.33 | 44.33 |
| Test | Fail | Pass | Pass | Pass | Fail | Pass | Pass | Pass |
| Glancing Impact Summary | | | | | | | | |
| Glancing Impact, % retained | 9.7 | 1.3 | 1.4 | 2.5 | 8.5 | 10.3 | 8.5 | 4.0 |

TABLE 13

Bromine Content vs Flame Performance of Flame-Retardant Wires (Insulated Conductors) Made from the Compositions of Table 10

| Component | Comp Ex 13 | Comp Ex 14 | Comp Ex 15 | Comp Ex 16 | Inv Ex 15 | Inv Ex 16 | Inv Ex 17 | Inv Ex 18 |
|---|---|---|---|---|---|---|---|---|
| FR type | Saytex 8010 | Saytex 8010 | Saytex 8010 | Saytex 8010 | Emerald Innovation 3000 | Emerald Innovation 3000 | Emerald Innovation 3000 | Emerald Innovation 3000 |
| Br wt % content | 12.345 | 24.69 | 37.035 | 49.38 | 9.75 | 19.5 | 29.25 | 39 |
| Average Total Char (mm) | 225 | 81.67 | 47.67 | 46.67 | 119.33 | 61.33 | 47.33 | 44.33 |

The invention claimed is:

1. A moisture-crosslinkable composition comprising, in weight percent (wt %) based on the weight of the composition:
   (A) 10-79 wt % alkoxysilane functionalized ethylenic polymer;
   (B) 16-70 wt % polymeric brominated flame retardant of a weight average molecular weight (Mw) equal to or greater than (≥) 1000 grams per mole (g/mol); and
   (C) 0.01-20 wt % silanol condensation catalyst.

2. The composition of claim 1 in which the alkoxysilane functionalized ethylenic polymer is at least one of an ethylene-silane reactor copolymer or a silane-grafted ethylenic polymer.

3. A moisture-crosslinkable composition comprising, in weight percent (wt %) based on the weight of the composition:
   (A) 4.0-83.67 wt % ethylenic polymer;
   (B) 0.3-5 wt % of a graftable silane-containing compound;
   (C) 0.02-1.0 wt % peroxide initiator;
   (D) 16-70 wt % polymeric brominated flame retardant of a weight average molecular weight (Mw) equal to or greater than (≥) 1000 grams per mole (g/mol); and
   (E) 0.01-20 wt % silanol condensation catalyst.

4. The composition of claim 3 in which the polymeric brominated flame retardant has a Mw>1,000 to 1,000,000 g/mol.

5. The composition of claim 3 in which the polymeric brominated flame retardant is a brominated polyphenyl ether or brominated styrene/butadiene block copolymer.

6. The composition of claim 3 in which the silanol condensation catalyst is a tin carboxylate.

7. A moisture-crosslinked composition comprising, in weight percent (wt %) based on the weight of the composition:
   (A) 10-79 wt % alkoxysilane functionalized ethylenic polymer;
   (B) 16-70 wt % polymeric brominated flame retardant of a weight average molecular weight (Mw) equal to or greater than (≥) 1000 grams per mole (g/mol); and
   (C) 0.01-20 wt % silanol condensation catalyst.

8. The moisture-crosslinked composition of claim 7 having hot creep <175% after 4 hours (h) of aging at 90° C. water bath.

9. A cable comprising a polymeric sheath made from the composition of claim 1.

10. The cable of claim 9 having at least one of the following properties:
    (A) horizontal burn performance: total char less than (≤) 100 millimeters (mm);
    (B) horizontal burn performance: time to extinguish <80 seconds (s); and
    (C) wet insulation resistance: greater than (>) 100 megaohm (Mohm).

* * * * *